(12) United States Patent
Vranceanu (10) Patent No.: US 9,674,427 B2
(45) Date of Patent: Jun. 6, 2017

(54) IMAGE PROCESSING METHOD AND APPARATUS

(71) Applicant: FotoNation Limited, Galway (IE)

(72) Inventor: Ruxandra Vranceanu, Bucharest (RO)

(73) Assignee: FotoNation Limited, Galway (IE)

( * ) Notice: Subject to any disclaimer, the term of this patent is extended or adjusted under 35 U.S.C. 154(b) by 0 days.

(21) Appl. No.: 15/092,001

(22) Filed: Apr. 6, 2016

(65) Prior Publication Data

US 2016/0301857 A1    Oct. 13, 2016

Related U.S. Application Data

(60) Provisional application No. 62/144,249, filed on Apr. 7, 2015.

(51) Int. Cl.
| | | |
|---|---|---|
| *H04N 5/232* | (2006.01) | |
| *G06T 5/00* | (2006.01) | |
| *H04N 9/64* | (2006.01) | |
| *G06T 5/50* | (2006.01) | |
| *G06T 7/00* | (2006.01) | |
| *G06K 9/00* | (2006.01) | |
| *G06K 9/22* | (2006.01) | |
| *G06K 9/03* | (2006.01) | |

(52) U.S. Cl.
CPC ..... *H04N 5/23219* (2013.01); *G06K 9/00234* (2013.01); *G06K 9/036* (2013.01); *G06K 9/22* (2013.01); *G06T 5/009* (2013.01); *G06T 5/50* (2013.01); *G06T 7/0002* (2013.01); *H04N 9/646* (2013.01); *G06T 2207/20208* (2013.01); *G06T 2207/20216* (2013.01); *G06T 2207/30168* (2013.01); *G06T 2207/30201* (2013.01); *G06T 2210/22* (2013.01)

(58) Field of Classification Search
CPC .... H04N 5/2355; H04N 5/235; H04N 5/2351; H04N 5/23219; G06T 5/007–5/009; G06T 7/0002; G06T 2207/20192; G06T 2207/20208; G06T 2207/30202
See application file for complete search history.

(56) References Cited

U.S. PATENT DOCUMENTS

2010/0283888 A1\*  11/2010  Mirbach ................ G01S 7/497
                                                                     348/348

FOREIGN PATENT DOCUMENTS

WO    WO2008018887    2/2008

\* cited by examiner

*Primary Examiner* — Paul Berardesca (57) ABSTRACT

An image processing method operable in a hand held image acquisition device comprising at least one camera comprises obtaining an image with the camera and identifying at least one face region detected within the image. A mean intensity of intensity values for pixels of at least one identified face region is determined. Responsive to the mean intensity for a face region being less than a threshold amount, at least some of the pixels of the image are lightened. A contrast of pixels of the image is enhanced as a function of pixel intensity distribution within the image and a contrast of pixels of the face region is enhanced as a function of pixel intensity distribution within the face region. The contrast enhanced pixels of the face region are blended with pixels of the image which have been lightened and/or whose contrast has been enhanced to provide a processed image.

15 Claims, 5 Drawing Sheets

IMAGE PROCESSING METHOD AND APPARATUS

FIELD

The present invention relates to an image processing method and apparatus.

BACKGROUND

It is well known in digital image acquisition devices that using automatic exposure settings for acquiring images of scenes including faces can lead to low contrast images with under-exposed faces.

Some solutions to this problem include capturing a number of images of a scene at different exposure levels and combining these in a high dynamic range (HDR) image. However, such techniques provide limited benefits for face regions.

It is an object of the present invention to mitigate problems with capturing images of such scenes.

SUMMARY

According to a first aspect of the present invention there is provided an image processing method according to claim 1.

This aspect of the invention finds particular utility in smart-phones, which typically include both a user-facing camera and a main camera. The user-facing camera is typically provided on the same surface of the device as a touch screen, speaker and microphone and this surface can be placed against a user's face when they make a call. The main camera is typically disposed on the opposite surface of the device. This can tend to lead to a build-up of oily deposits over the user-facing camera lens, so adversely affecting the quality of image acquired by the camera sensor.

Using this aspect of the invention, the image acquisition device can readily detect if camera performance is being affected by a greasy or dirty lens and can signal to the user that the lens should be cleaned to improve performance.

According to a second aspect of the present invention there is provided an image processing method according to claim 6.

This method improves the image quality of images including face regions, which might otherwise lack contrast or be underexposed, but without generating processing artifacts within the image.

In still further aspects there is provided an image acquisition device arranged to perform one or both of the above methods.

Separately, there is provided a non-transient computer readable medium comprising computer executable instructions, which instructions when executed on an image acquisition device, cause the image acquisition device to perform one or both of the above methods.

BRIEF DESCRIPTION OF THE DRAWINGS

Various embodiments of the invention will now be described, by way of example, with reference to the accompanying drawings, in which.

DESCRIPTION OF THE PREFERRED EMBODIMENTS

Figure 1:
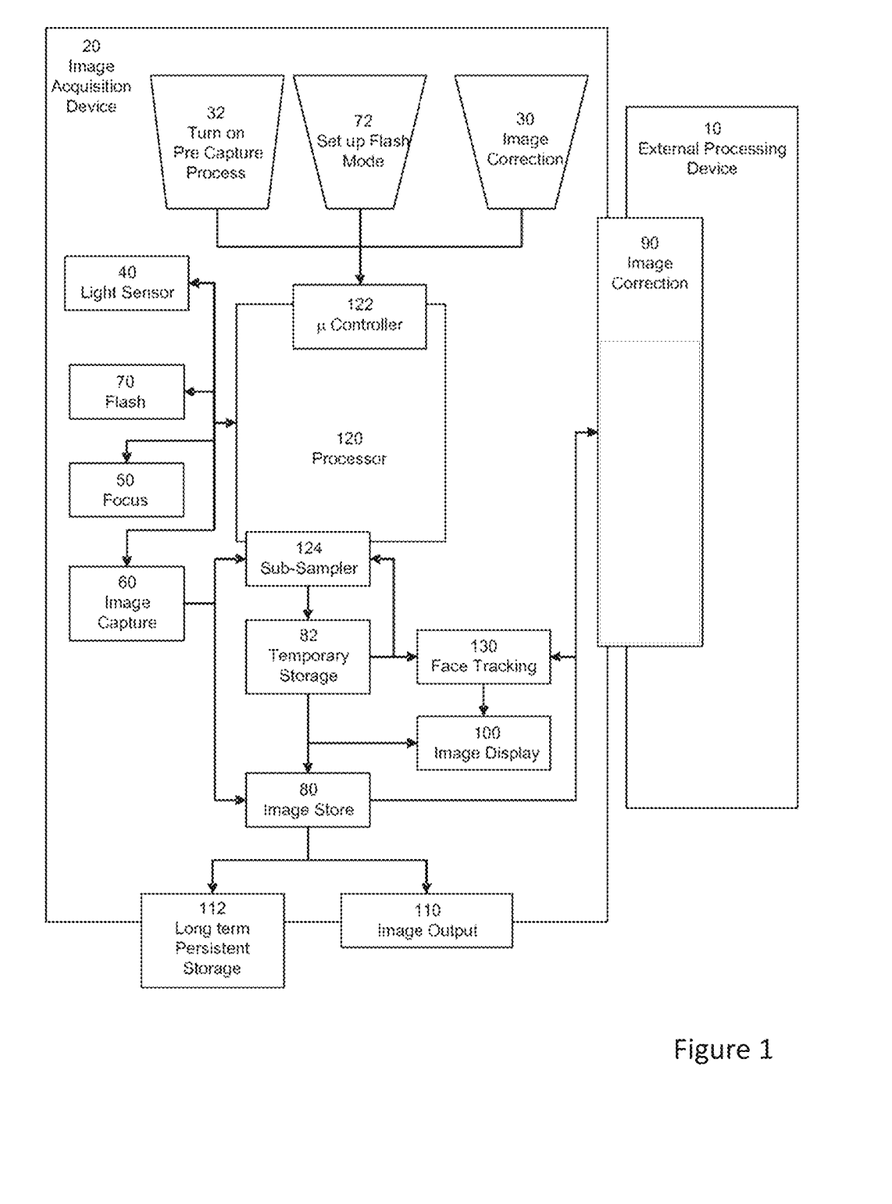
FIG. 1 is a block diagram of an image acquisition device on which embodiments of the present invention can be implemented.

Referring now to FIG. 1, which is a block diagram of an image acquisition device 20, which in the present embodiment is a portable digital camera, operating in accordance with certain embodiments. It will be appreciated that many of the processes implemented in the digital camera are implemented in or controlled by software operating on a microprocessor, central processing unit, controller, digital signal processor and/or an application specific integrated circuit, collectively depicted as processor 120. All user interface and control of peripheral components such as buttons and display is controlled by a microcontroller 122.

In operation, the processor 120, in response to a user input at 122, such as half pressing a shutter button (pre-capture mode 32), initiates and controls the digital photographic process. Ambient light exposure is determined using a light sensor 40 in order to automatically determine if a flash is to be used. The distance to the subject is determined using a focusing mechanism 50, which also focuses the image on an image capture device 60. If a flash is to be used, processor 120 causes a flash device 70 to generate a photographic flash in substantial coincidence with the recording of the image by the image capture device 60 upon full depression of the shutter button. The image capture device 60 digitally records the image in color. The image capture device is known to those familiar with the art and may include a CCD (charge coupled device) or CMOS to facilitate digital recording. The flash may be selectively generated either in response to the light sensor 40 or a manual input 72 from the user of the camera. The high resolution image recorded by image capture device 60 is stored in an image store 80 which may comprise computer memory such a dynamic random access memory or a non-volatile memory. The camera is equipped with a display 100, such as an LCD, both for displaying preview images and displaying a user interface for camera control software.

In the case of preview images which are generated in the pre-capture mode 32 with the shutter button half-pressed, the display 100 can assist the user in composing the image, as well as being used to determine focusing and exposure. Temporary storage 82 is used to store one or plurality of the stream of preview images and can be part of the image store 80 or a separate component. The preview image is usually generated by the image capture device 60. For speed and memory efficiency reasons, preview images may have a lower pixel resolution than the main image taken when the shutter button is fully depressed, and can be generated by sub-sampling a raw captured image using software 124 which can be part of the general processor 120 or dedicated hardware or combination thereof.

In the present embodiment, a face detection and tracking module 130 such as described for example, PCT Publication No. WO2008/018887 (Ref: FN-143), is operably connected to the sub-sampler 124 to control the sub-sampled resolution of the preview images in accordance with the requirements of the face detection and tracking module. Preview images stored in temporary storage 82 are available to the module 130 which records the locations of faces tracked and detected in the preview image stream. In one embodiment, the module 130 is operably connected to the display 100 so that boundaries of detected and tracked face regions can be superimposed on the display around the faces during preview.

In FIG. 1, the face tracking module 130 is arranged to extract and store tracked facial regions at relatively low resolution in a memory buffer such as memory 82 and possibly for storage as meta-data in an acquired image header stored in memory 80. Where multiple face regions are tracked, a buffer is established for each tracked face region. These buffers are of finite size (10-20 extracted face regions in a preferred embodiment) and generally operate on a first-in-first-out (FIFO) basis.

According to the preferred embodiment, the device 20 further comprises an image correction module 90 operating as described in more detail in relation to FIGS. 2-5. Where the module 90 is arranged for off-line correction of acquired images in an external processing device 10, such as a desktop computer, a colour printer or a photo kiosk, face regions detected and/or tracked in preview images are preferably stored as meta-data within the image header. However, where the module 90 is implemented within the camera 20, it can have direct access to the buffer 82 where preview images and/or face region information is stored.

In this embodiment, the module 90 receives the captured high resolution digital image from the store 80 and analyzes it to improve the quality of the image. The module can modify the image and the modified image may be either displayed on image display 100, saved on a persistent storage 112 which can be internal or a removable storage such as CF card, SD card or the like, or downloaded to another device via image output means 110 which can be tethered or wireless. The module 90 can be brought into operation either automatically each time an image is captured, or upon user demand via input 30. Although illustrated as a separate item, where the module 90 is part of the camera, it may be implemented by suitable software on the processor 120.

Embodiments of the present invention analyze the luminance of pixels at least within detected face regions of an acquired image and determine how well the face regions and/or the image cover the dynamic range. The method can then determine transformations to improve the exposure and contrast of face regions within the image without causing processing artefacts; and/or warn the user to clean the camera lens.

It will be appreciated that images can be acquired in any number of formats including RGB, LAB, YCC, YUV etc. In some cases such as LAB, YCC or YUV, one of the color planes L or Y provides a luminance value 0 Luminance Maxlevel, typically 255 for 8 bit pixels, directly, whereas for others such as RGB, color plane information needs to be combined or transformed to provide a luminance value, for example, Luminance=0.2126*R+0.7152*G+0.0722*B or 0.299*R+0.587*G+0.114* B.

Figure 2:
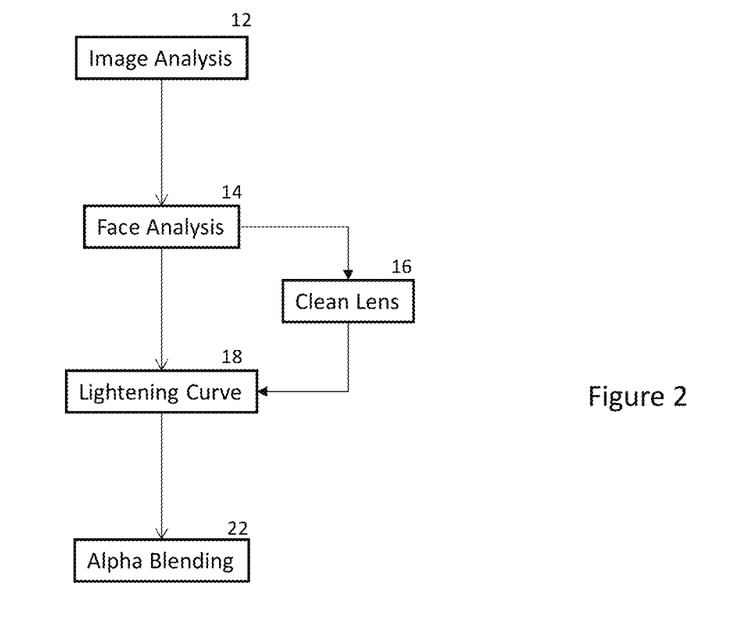
FIG. 2 is a diagram illustrating generally the image processing steps for an embodiment of the present invention.
Figure 3A:
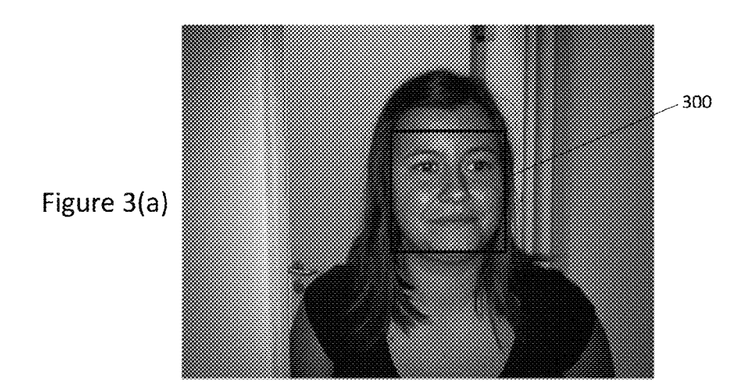
FIG. 3(a) illustrates a typical scene including a face to be processed according to an embodiment of the present invention.

Referring to FIG. 2, in a first image processing stage performed by the module 90, the pixels for substantially an entire image are analysed, step 12. The analysis comprises providing a histogram of pixel intensities for substantially the entire image. FIG. 3(a) shows an exemplary image including a single detected face region 300 and FIG. 3(b) shows histogram information for this image.

Figure 3B:
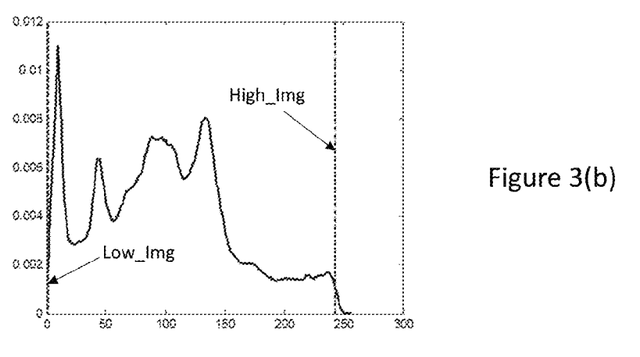
FIG. 3(b) is a histogram of pixel intensities for the image of FIG. 3(a)

In FIG. 3(b), Low_Img is determined as a threshold below which, for example, 0.3% of the darkest pixels in the image can be found. High_Img is determined as a threshold above which, for example, 2% of the lightest pixels in the image can be found. Note that the percentages defining the thresholds are adaptable to model user preferences. In the example provided, Low_Img=1 and High_Img=230.

Referring back to FIG. 2, in a second stage of image processing, the pixels for each face region detected within the image can be analysed, step 14. In this case, the analysis comprises providing respective histograms of pixel intensities for each detected face region. Nonetheless, it will be appreciated that in variants of this embodiment, this analysis might not be performed for every detected face region. For example, the analysis may only be performed for the largest detected face region; or only a given number of detected face regions; or only for face regions above a given size.

Figure 3C:
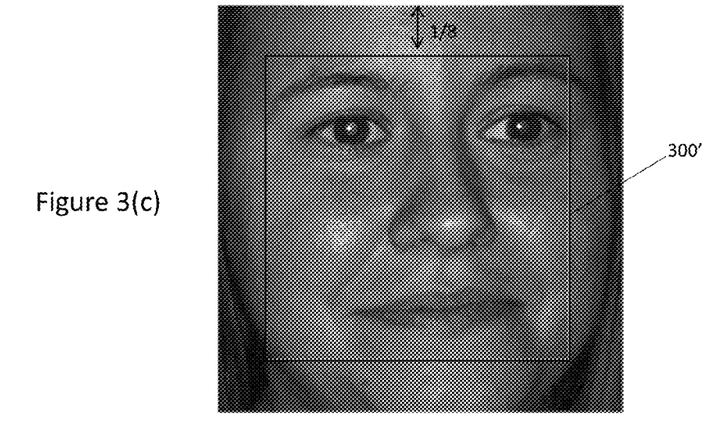
FIG. 3(c) shows a face crop for a face region detected within the image of FIG. 3(a)
Figure 3D:
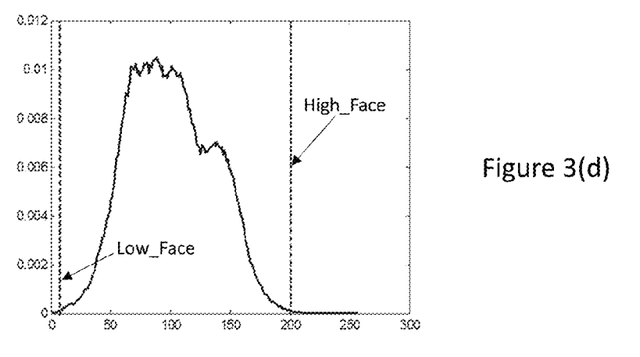
FIG. 3(d) is a histogram of pixel intensities for the face crop of FIG. 3(c)

In any case, FIG. 3(c) shows in more detail the single detected face region 300 from the image of FIG. 3(a); and within the face region 300, a face crop 300' whose pixels are analysed. In this case, the boundary for the face crop is set with a ⅛ margin inside the originally detected boundary for the face region 300 to ensure that as far as possible only face features are analysed. FIG. 3(d) shows histogram information for the face crop 300'.

In FIG. 3(d), Low_Face is determined as a threshold below which, for example, 0.1% of the darkest pixels in the face crop 300' can be found. High_Face is determined as a threshold above which, for example, 0.1% of the lightest pixels in the face crop 300' can be found. Note that again, the percentages defining the thresholds are adaptable to model user preferences. In the example provided, Low_Face=10 and High_Face=201.

It will be appreciated that in variants of the described method, steps 12 and 14 can be reversed or performed in parallel.

As soon as the Low_Face figure for any face regions is available, a determination can be made as to whether or not the camera lens needs to be cleaned, step 16. This step can be performed only if the image has been acquired with a user-facing camera; or indeed the step can be performed whether the image has been acquired with either the user-facing camera or the main camera. It will nonetheless be appreciated that because of contact with the user's face, the user-facing camera is more susceptible to being covered with an oily or greasy film which might not otherwise be appreciated by the user and which may limit the quality of images acquired with that camera.

In any case, if Low_Face for any detected face is above a given threshold, then this indicates that less than a threshold number of pixels have the highest intensity values. In this case, the apparatus signals to a user that a lens for the camera which acquired the image needs to be cleaned. This signal can comprise any combination of visual warning on the display 100, an audio warning or haptic feedback. In one example, the threshold is chosen as about 30.

In variants of this approach, this detection based on Low_Face may only be performed for the largest detected face region; or only a given number of detected face regions; or only for face regions above a given size.

In variants of the above approach, an assessment of Low_Face can be combined with an assessment of Low_Img to determine if the apparatus should signal that the lens should be cleaned. Thus, such embodiments could signal that lens cleaning is required when Low_Face is greater than 30 and Low_Img is greater than 20.

In still further variants of this approach, if an acquired image does not include a face region, then Low_Img alone could be used to determine if an indication should be provided to a user that the lens needs to be cleaned.

It will also be appreciated that the image being analysed in steps 12-16 above can be a preview image of a scene available from storage 82 and the signal to a user indicating the camera lens needs to be cleaned can be provided before the user attempts to capture a main image of the scene.

Regardless of whether step 16 is performed or if it indicates that the camera lens needs to be cleaned, the method can continue to determine how any acquired image might be improved.

In this case, the acquired image is a main image which has been obtained by the image acquisition device and the following steps can be performed prior to the image being stored in storage 80 or 112 and/or transmitted to another device such as device 10; or after the image has been stored in storage 80 or 112 or received from another device such as the device 10.

If step 14 has been performed on a preview image, then this step may need to be repeated for the main image, but if there is very little difference between the images either in content, alignment or exposure, this may not be necessary. It will be appreciated that where Low_Img is not employed in step 16, step 12 need not be performed on a preview image, because as will be appreciated below, its output is only required for processing a main image.

In step 18, respective mean luminance values for any face crop regions detected within the image are determined. Again, this might only be performed for example, for the largest detected face region; or only a given number of detected face regions; or only for face regions above a given size. (Again this step could be performed on a preview image where it did not differ significantly from a main image.) If these mean luminance values are greater than 150 (on a scale of 0 to 255) for each detected face region, then lightening need not be applied. However, contrast enhancement as explained in relation to step 22 may still be applied.

However, when mean luminance for any face crop, which has been analyzed is less than 150, then lightening and contrast enhancement is applied to the entire image and face crop(s) as follows:

Firstly, the values which are to be used in face region contrast enhancement are adjusted. For each face region which is to be lightened:

$$Low\_Face = \min(Low\_Face, Low\_Img+15)$$

In this case, Low_Face for a face region is chosen as the lower of the originally measured Low_Face for the face region (this may differ from face region to face region) and the Low_Img value, plus a margin, in this case 15. It will be appreciated that this margin may vary. Thus, Low_Face is chosen as Low_Img+15, if the low luminance threshold for a face is not greater than the low luminance threshold for the image plus 15. As will be seen from the face transformation of FIG. 5, this adjustment tends to increase the contrast of a face less if a relatively dark image is being processed. Otherwise stated, this adjustment tends to increase the contrast of the face less if the image needs far less contrast enhancement than the face in the lower part of the dynamic range.

Also:

$$High\_Face = \max(High\_Face, High\_Img-25)$$

Figure 5:
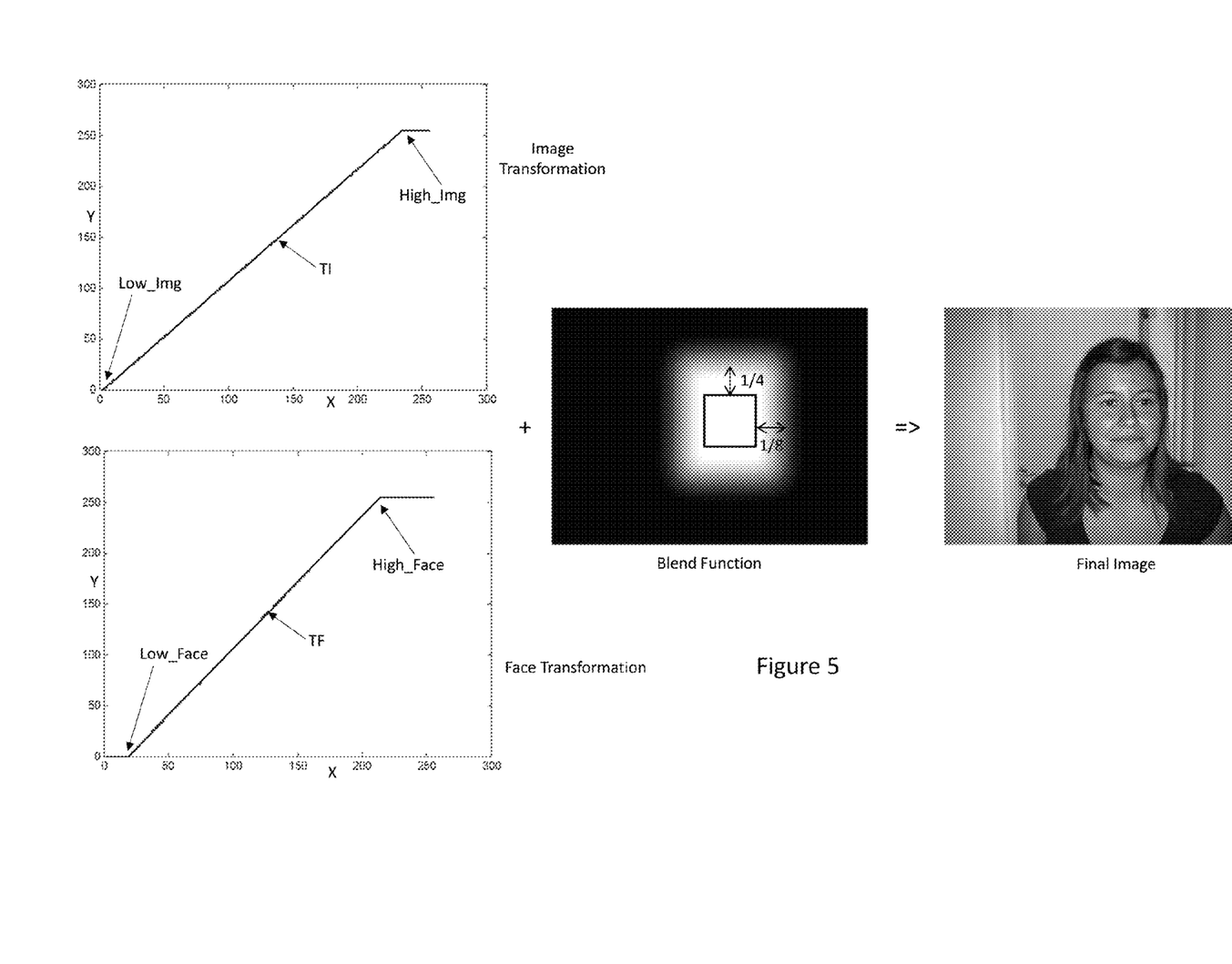
FIG. 5 illustrates one technique for blending an image and a face crop, each with contrast enhanced with respective functions.

Again, as will be seen from the face transformation of FIG. 5, this adjustment tends to increase the contrast of the face less if the image needs far less contrast enhancement than the face in the upper part of the dynamic range.

The purpose of these restrictions is to not allow lightening and contrast transformations described below to exceed a point where it becomes evident that an image/face region has been processed. For example, if image and face region lightening are very different, a halo could appear around the face; or unnatural skin colour transitions may be seen on the neck.

Before increasing the contrast of the image or face regions, MeanFace*, based on the mean luminance values for any detected face crop(s), is used to determine the lightening to be applied to the image.

Where multiple faces have been detected in an image, MeanFace* may be taken as the MeanFace value for the largest detected face region; or the average or darkest MeanFace value from only a given number of detected face regions; or the average or darkest MeanFace value from only face regions above a given size.

Figure 4A:
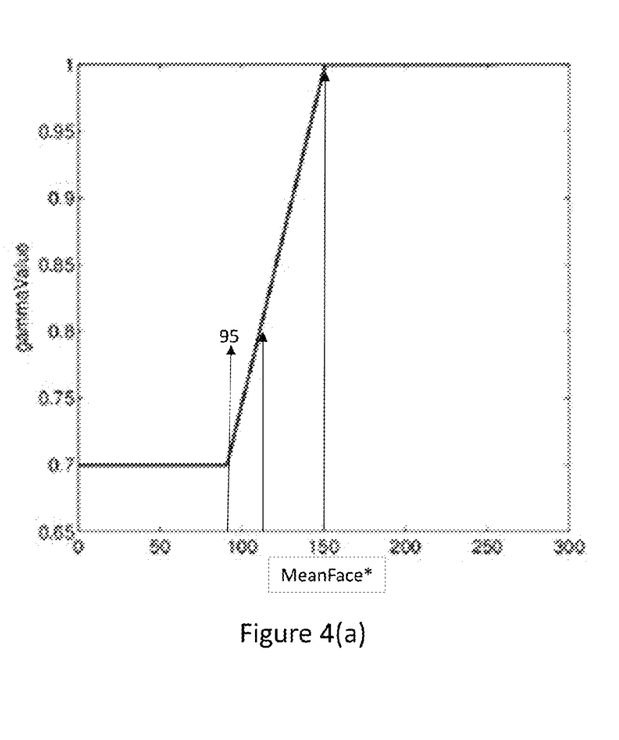
FIG. 4(a) illustrates a function mapping a mean luminance value for any face crops of an image to a gamma value used for image lightening.

FIG. 4(a) shows an exemplary function mapping any determined values of MeanFace* to Gamma values for a lightening function. In this case, Gamma ranges from 0.7 to 1.0 with values of 1.0 providing no lightening of the image and values of 0.7 providing maximum lightening. So in the exemplary function of FIG. 4(a), for MeanFace* values greater than 150, no lightening of the image occurs, whereas for MeanFace* values less than 95, a maximum lightening is performed. In the present example for the image of FIGS. 3(a) and 3(c), a gamma value of 0.8 is determined. This gamma value can be used in a lightening function such as shown in FIG. 4(b) to brighten the pixels of the image (as will be seen, the gamma correction curve is above the unitary curve).

In variations of this lightening approach, lightening could be performed differently on the face region(s) and the remainder of the image or image background. For example, when a face region is very dark, but the remainder of the image is well lit, as in backlight scenarios, the extent of lightening or indeed the lighting of the remainder of the image could be reduced relative to the face regions e.g. only a dark face would be lightened, with the remainder of the image remaining the same. In this case, the mean luminance of the image could be used as an indicator that the image needs less lighting/lightening. This approach may also need some restrictions so that the difference between face region and non-face region lightening does not produce unwanted artifacts.

Whether a lightened image has been provided in accordance with step 18 or an original image is used, where MeanFace* is greater than 150, contrast enhancement of the image and the face crop regions can be performed before blending the resultant image and face regions together, step 22.

Figure 4B:
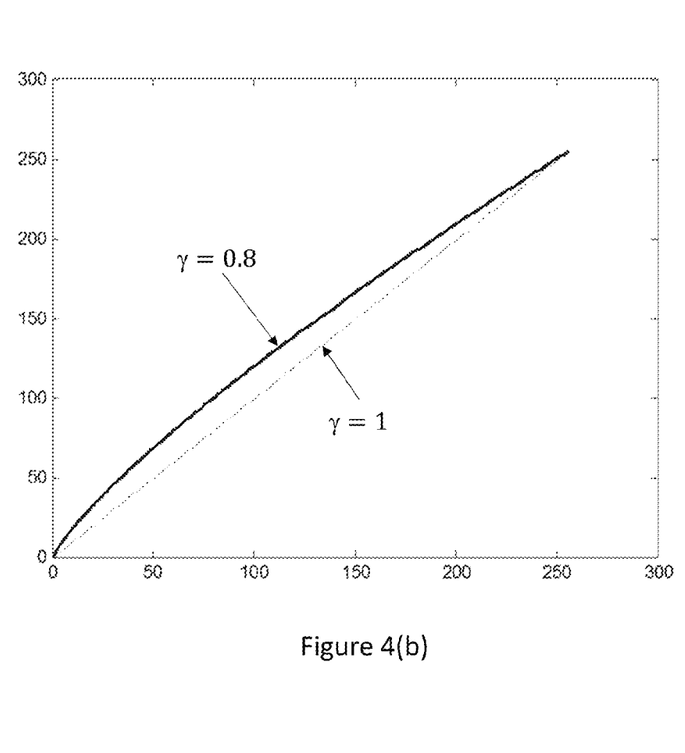
FIG. 4(b) illustrates an image lightening function based on an exemplary gamma correction factor of 0.8.

Referring to FIG. 5, an image transformation function converts intensity values for the image lightened according to the function of FIG. 4(b) to improve the contrast of the image. Note that in this case for input image intensity values (on the X axis) greater than High_Img, a saturated value (on the Y axis) for the enhanced image is chosen. Similarly, for input image intensity values less than Low_Img, a zero value for the enhanced image is chosen. Referring back to FIG. 3(b), because the number of pixels in the image above and below these thresholds only comprise a relatively small number of the pixels in the image, contrast is enhanced as indicated by the increased slope of the line TI vis-à-vis a 1-to-1 relationship between X and Y axis values, but without adversely affecting the perception of the final image.

Separately, for each face crop within each face region whose contrast is to be enhanced a transformation function converts intensity values for the face crop lightened according to the function of FIG. 4(b) to improve the contrast of the face region.

It will be appreciated that contrast enhancement may only be performed for the largest detected face region; or only a given number of detected face regions; or only for face regions above a given size.

Note that as above, for input image intensity values (on the X axis) greater than High_Face, a saturated value (on the Y axis) for the enhanced face crop is chosen. Similarly, for input image intensity values less than Low_Face, a zero value for the enhanced image is chosen. Again, referring back to FIG. 3(d), because the number of pixels in face crops above and below these thresholds only comprise a relatively small number of the pixels in a face crop, contrast is enhanced as indicated by the increased slope of the line TF vis-à-vis a 1-to-1 relationship between X and Y axis values, but without adversely affecting the perception of the final image.

Finally, once the contrast for each of the image and the face crops which are to be enhanced is completed, the resultant images are blended together. Where the face tracker 130 employs square classifiers and detected face regions such as region 300 are square (and faces tend to be more rectangular), the blending function blends a lightened and enhanced face crop into the lightened and enhanced image across a greater length in the face height direction (¼ of the crop height) than in the face width direction (⅛ of the crop width) to blend an entire face back into the image.

The final blended image now exhibits a better exposed and improved contrast face region than without the benefit of the present invention and without displaying significant artefacts of the processing.

The invention claimed is:

1. An image processing method operable in a hand held image acquisition device with a user-facing camera comprising:
   a) obtaining an image with the user-facing camera;
   b) identifying at least one face region within the image;
   c) determining a distribution of intensity values for pixels of at least one identified face region; and
   d) responsive to less than a threshold number of pixels for an identified face region having intensity values having a lowest intensity value, signalling to a user that a lens for the user-facing camera needs to be cleaned.

2. A method according to claim 1 wherein the image is a preview image.

3. A method according to claim 2 comprising performing said steps before acquiring a main image.

4. A method according to claim 1 wherein said determining a distribution of intensity values is performed for respective face crops of the at least one identified face region.

5. A method according to claim 1 further comprising:
   e) determining a mean intensity of intensity values for pixels of at least one identified face region;
   f) responsive to said mean intensity for a face region being less than a threshold amount, lightening at least some of the pixels of said image,
   g) enhancing a contrast of pixels of said image as a function of pixel intensity distribution within the image,
   h) enhancing a contrast of pixels of at least one face region as a function of pixel intensity distribution within the face region; and
   i) blending said contrast enhanced pixels of said face region with pixels of said image which have been lightened and/or whose contrast has been enhanced to provide a processed image.

6. An image processing method operable in a hand held image acquisition device comprising at least one camera, the method comprising:
   a) obtaining an image with the camera;
   b) identifying at least one face region detected within the image;
   c) determining a mean intensity of intensity values for pixels of at least one identified face region;
   d) responsive to said mean intensity for a face region being less than a threshold amount, lightening at least some of the pixels of said image,
   e) enhancing a contrast of pixels of said image as a function of pixel intensity distribution within the image, and
   f) enhancing a contrast of pixels of said face region as a function of pixel intensity distribution within the face region; and
   g) blending said contrast enhanced pixels of said face region with pixels of said image which have been lightened and/or whose contrast has been enhanced to provide a processed image.

7. A method as claimed in claim 6 comprising performing at least said lightening, enhancing and blending steps on a main acquired image.

8. A method as claimed in claim 6 further comprising:
   determining a distribution of intensity values for the image; and
   determining a distribution of intensity values for pixels of at least one identified face region;
   determining a first threshold above which a first percentage of pixels of the image have a higher intensity;
   determining a second threshold below which a second percentage of pixels of the image have a lower intensity;
   determining third respective thresholds above which a third percentage of pixels of the at least one identified face region have a higher intensity;
   determining fourth respective thresholds below which a fourth percentage of pixels of the at least one identified face region have a lower intensity; and
   wherein said enhancing a contrast comprises:
   saturating pixels of said image with intensities above said first threshold;
   setting pixels of said image with intensities below said second threshold to zero;
   saturating pixels of said at least one face region with intensities above respective ones of said third thresholds; and
   setting pixels of said at least one face region with intensities below respective ones of said fourth thresholds to zero.

9. A method as claimed in claim 8 further comprising adjusting said fourth respective thresholds as a function of said second threshold and adjusting said third respective thresholds as a function of said first threshold.

10. A method as claimed in claim 8 wherein said enhancing a contrast comprising performing a linear transformation of image pixels between said first and second thresholds;
and performing a linear transformation of face region pixels between said third respective and fourth respective thresholds.

11. A method as claimed in claim 6 wherein said lightening comprises applying a gamma function to at least some of the pixels of said image.

12. A method as claimed in claim 5 wherein a magnitude of said lightening is inversely proportional to said mean intensity.

13. A method as claimed in claim 6 wherein said determining a mean intensity of intensity values and enhancing are performed for respective face crops of the at least one identified face region.

14. An image acquisition device arranged to perform the method of claim 1.

15. A non-transient computer readable medium comprising computer executable instructions, which instructions when executed on an image acquisition device, cause the image acquisition device to perform the method of claim 1.

* * * * *